Sept. 6, 1966        J. R. BRINKERHOFF        3,271,596
ELECTROMECHANICAL TRANSDUCERS
Filed Nov. 12, 1963
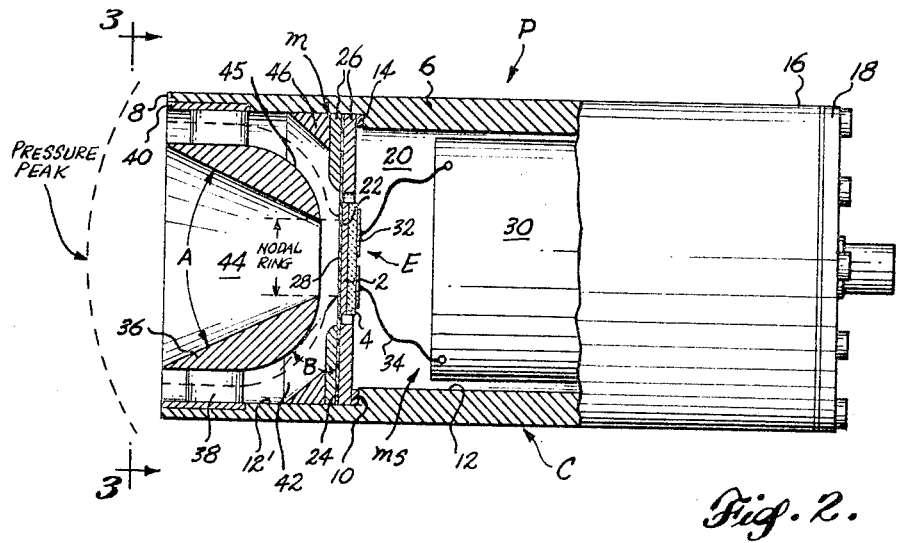
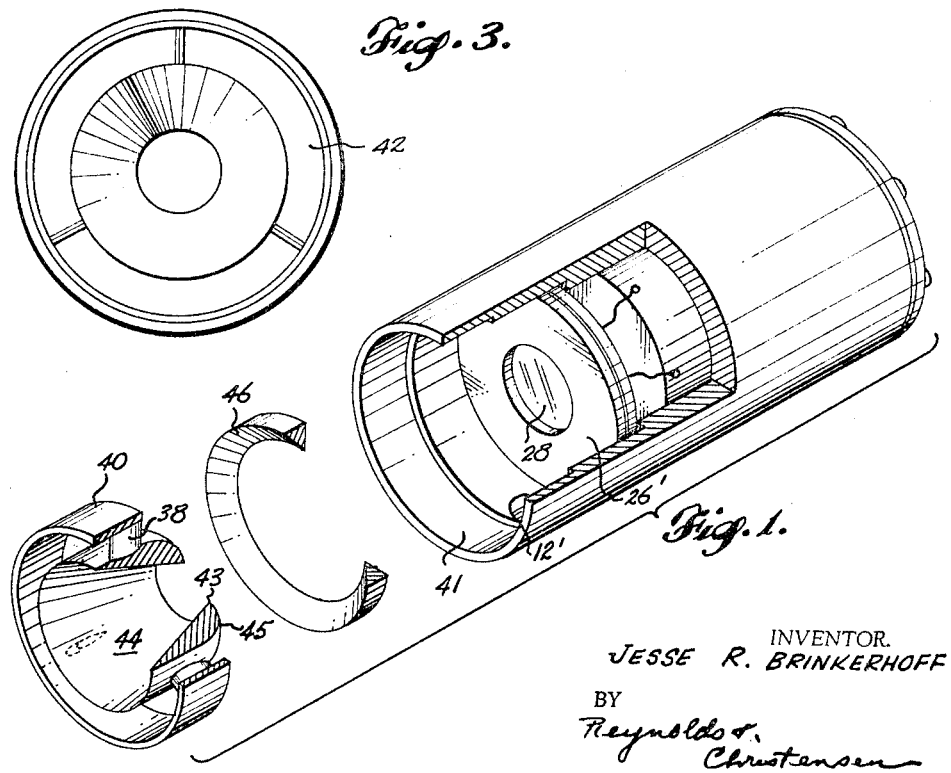
INVENTOR.
JESSE R. BRINKERHOFF
BY Reynolds &
Christensen
ATTORNEYS 3,271,596
ELECTROMECHANICAL TRANSDUCERS
Jesse R. Brinkerhoff, Seattle, Wash., assignor to The Boeing Company, Seattle, Wash., a corporation of Delaware
Filed Nov. 12, 1963, Ser. No. 322,941
5 Claims. (Cl. 310—8.7)

This invention relates to electromechanical transducers for the conversion of electrical energy into acoustical energy, or vice versa, in either gaseous or liquid fluids. More particularly, it relates to electromechanical transducers of the type which use a flexural mode transducer element. The element may be fabricated from materials of the earlier known type usually obtained or grown as crystals and often designated piezo-electric, or it may employ materials of the type which are synthetically produced and polarized and often designated ferroelectric. A combination is also possible. In either instance, the element may also be fabricated either as a single crystal or as a composite or laminated unit.

A principal object of my invention is to improve the efficiency of electromechanical transducers of this type. My invention also has the object of providing a means and technique by which to control the shape, size, and/or direction of the pressure wave transmitted to or received from such a transducer. Related objects include improving the sensitivity of receiver transducers such as those employed in microphones and improving the directionality of transducers used in transmitter applications. Still other objects will appear from the description following.

For the natural mode of vibration of a free vibrating body, such as a disc, it is well-known that the center portion of the body moves out of phase with the peripheral portion of the body. The two portions are separated by the nodal contour, where there is effectively no motion in the direction of vibration. If an entire face of the body is permitted, for example, to radiate pressure waves into a fluid medium, there is a reduction in sensitivity of the structure due to the canceling effect of the out-of-phase vibrations. In order to prevent this phase interference, washer-like acoustic isolators made of an absorptive material have been used with disc-shaped elements to decouple the peripheral portion of the disc so that only the center portion drives the fluid. See for example the U.S. patent to Massa No. 2,967,957, dated January 10, 1961, where a cork washer is used over the peripheral portion.

To the contrary and in accord with my invention, I would reinforce the radiation from the center portion—which can aptly be termed the "central radiation"—with the radiation from the peripheral portion, that is, the "peripheral radiation." This is accomplished, in essence, by mounting the transducer element in a housing structure having means thereon which define two pathways to the surrounding medium for the radiation from the element, one of which carries the central radiation, and the other of which carries the peripheral radiation. This division of the radiation enables the peripheral radiation to be brought into phase alignment with the central radiation by making the pathway for the peripheral radiation 0.5 of a wavelength longer than that for the central radiation with respect to the distance each travel to the surrounding medium.

I use an open-ended housing structure within which the transducer element is mounted so as to radiate out through the opening, there being a tubular mullion suspended in the path of radiation so as to form the pathways for the two components. The mullion has a longer length of contour over its external surface than over its internal surface, thus causing the peripheral radiation to follow a longer course around it.

Ordinarily, the mullion should be at least three wavelengths in length and should be spaced within 0.5 of a wavelength from the radiating face of the element. It is also desirable to streamline the pathways to reduce turbulence and to obtain more uniform flow, and to use a hard-surfaced, non-absorptive material for the mullion. However, there are no critical tolerances or materials involved in any of these factors, since each selection is a question of the degree of efficiency that is sought.

Certain factors can be used to advantage, however, in controlling the size, shape, and/or direction of the pressure wave. I shall discuss these in the more detailed description following which refers to the accompanying drawing wherein:

FIGURE 1 is an exploded view in perspective of a transducer constructed according to the invention, with certain of the elements therein having a part section removed so as to aid in the overall illustration;

FIGURE 2 is a longitudinal cross-sectional view of the transducer; and

FIGURE 3 is a front elevational view of the same.

The unit selected for illustration was fabricated for use in a hydrofoil vessel distance gauging system of the sonic or ultrasonic type in which one transducer is energized periodically with supersonic oscillations to emit a train of pressure wave impulses directed down at the water; and another acts to pick up the echo pulses for purposes of measuring the time interval between transmission and reception. It employs a circular transducer element E of the laminated flexural mode or bender type which in this case is fashioned from an inert elastic (such as aluminum) disc 2 that is intimately bonded to a polarized ceramic (such as barium titanate) disc 4 so as to form a ferroelectric sandwich of a type which is known in the art. When energized, the ceramic disc 2 operates in its radial or transverse mode and alternately contracts and expands with the applied field. The aluminum disc 4, on the other hand, being unaffected by the field, retains its dimensions and introduces an asymmetry. The result is a bending or flexural action on the part of the sandwich which acts to generate pressure wave pulses in the surrounding atmosphere.

The element E is mounted and housed in a package P which is designed to protect it from the surrounding atmosphere, marine or otherwise, without impairing its ability to produce the intense compressional wave vibrations needed for the above use of it. Within the package, there are three supporting components for the transducer element. These are a suspension mount M for the element, a casing C for the mount, and certain interior members MS of the means by which to energize the element. The casing C is in the form of a tube 6 one end 8 of which has been interiorly enlarged so as to form a shoulder 10 in the wall of its bore 12. This enlarged end 12' of the bore operates to receive the mount M which is seated on the shoulder 10 transversely of the tube 6 with a neoprene ring 14 inserted between the two so as to enable the mount to close off and seal the end 8 of the tube. The other end 16 of the tube is likewise closed off and sealed by a cap 18 so that a chamber 20 is formed between the mount M and the cap 18 which is waterproofed against the entry of moisture.

The mounting of the suspension mount M in effect places the transducer element E interiorly of the chamber 20. Prior to the assembly of the units, the element is bonded to one face 22 of a Mylar diaphragm 24 the periphery of which is clamped between a pair of aluminum gaskets 26 that are sized exteriorly to lend to the sealing function of the mount M in the end 8 of the tube. Then, on assembly of the unit, the mount is inserted into the enlarged end 12' of the tube's bore with the transducer element E advancing ahead of the diaphragm 24 so that the latter in effect becomes the radiating face 28 of the assembly, the element E being free to drive the diaphragm over a wide range by virtue of the fact there is sufficient spacing between its periphery and the surrounding walls of the gaskets to allow for its vibration essentially in the manner of a free vibrating disc.

A thixotropic cement or adhesive is commonly used to bond the element to the diaphragm.

The transducer element E is energized from means including a circuit board assembly 30 at the rear of the chamber which is connected with half-moon-shaped silver segment terminals 32 on the exposed face of the element by way of flexible electrical leads 34 joining the two.

In use, the transducer element E flexes about a nodal ring with the result that the outer or peripheral portion of the element is always moving out of phase with the center portion. To bring the radiation from the two portions into phase alignment in accord with my invention, I also insert into the enlarged end of the tube's bore a smaller tubular member 36 which I prefer to call a "mullion" due to its function of dividing and separating the radiation into two paths. The so-called mullion is itself undersized for the end 12' of the tube's bore but it is suspended in a field of spars or vanes 28 which extend radially inwardly of a collar 40 that is sized to be received in and flush with a rabbet 41 countersunk from the edge of the end 12'. This spider suspension of the mullion leaves it engaged more or less coaxially of the bore 12 with an annular channel 42 separating it from the wall of the bore. The length of the mullion also is such as to leave its inside end 43 spaced from the face 28 of the diaphragm. Furthermore, the mullion is fashioned such that its inner peripheral edge at its inside end 43 is substantially coincident in projection with the nodal ring of the element E. In short, then, the mullion is constructed and mounted to cooperate with the end 12' of the bore in defining a pair of pathways for the two components of radiation; to wit that formed by the channel 42 for the peripheral radiation and that formed through the core of the hollow 44 of the mullion for the central radiation.

Additionally, the configuration of the mullion is such as to meet the requirement of a longer pathway for the peripheral radiation, although its configuration is only representative of several that can be employed for this purpose with respect to a tubular member. Interiorly, it has a conical cross-section the flare of which increases uniformly in the radially outward direction from the face 28 of the diaphragm. Exteriorly, it has a bulbous cross-section which begins as a smooth curve 45 from the inner peripheral edge of its inside end 43. Under these circumstances, pressure peaks or waves lamina moving through the channel 42 are constrained to follow a longer path to the interface with the surrounding medium than are ones moving through the hollow 44 of the mullion. The average of the wave lamina across the channel 42 is made to reach the interface simultaneously with the more direct but operationally staggered wave lamina moving through the hollow 44. An average path length of 0.5 of a wavelength longer for the peripheral radiation effectively achieves this end. It is also facilitated by streamlining the channel, as by placing a ring 46 of mitered cross-section in the corner defined by the intersection of the outer 26' of the gaskets 26 and the wall of the bore 12' thus reducing or eliminating turbulence in that corner and promoting greater uniformity of flow in the channel 42.

The mullion is preferably constructed of aluminum.

As mentioned earlier, there are no critical tolerances with regard to the shape, size, materials, and mounting of the mullion. There are, however, factors which enable one to control the size, shape, and/or direction of the pressure wave. For example, both the length and diameter of the mullion affect the shape and size of the wave, as does the pitch of the angles described by the hollow of the mullion, as seen at A, and the mean tangent of the curve 45 with respect to the face 28 of the diaphragm, as seen at B. The actual shape of the mullion is also a factor in this respect. I normally do not use a mullion of less than 3 wavelengths in length because the path 42 becomes too short for purposes of its relationship with the length of the path 44.

The angle A is suitable at 45° as is the angle B at 30°, although, again, they may vary considerably from these figures. Most of my figures are based on empirical determinations, but should provide a rough guide in the selection of a mullion for each frequency or frequency range, particularly when coupled with certain mathematical guides which will appear to one in this art. They also assume a position for the mullion, such as that shown, wherein it is substantially coaxial with the transducer element and the radiating face of the diaphragm. It may be that a skewed position is more desirable in a particular application and such is contemplated, as are numerous other modifications and additions which will appear to one in the art without departing from the spirit of the invention as defined in the claims following.

I claim as my invention:

1. In an electromechanical transducer, the combination of a flexural mode transducer element which is mounted in an open-ended housing to transmit or receive a pressure wave in the direction of vibration thereof, the relatively central and peripheral portions thereof tending to vibrate out of phase with one another about a nodal contour of substantially no motion in the direction of vibration, and means on the housing which operate to define a plurality of pathways for the pressure wave between the end opening of the housing and the adjacent face of the element, one of which pathways extends between the end opening and the center portion of the face to carry pressure peaks in the center of the wave, and the other of which extends between the opening and the peripheral portion of the face to carry pressure peaks in the periphery of the wave, said other pathway being approximately 0.5 of a wavelength longer than the one pathway so that corresponding pressure peaks in the center and periphery of the wave are brought into phase with one another in traveling between the end opening of the housing and the face of the element.

2. An electromechanical transducer according to claim 1 wherein the path defining means includes a tubular mullion which is positioned in the end opening of the housing and has a longer length of contour over its outside surface than over its inside surface.

3. An electromechanical transducer according to claim 2 wherein the mullion is disposed on the center axis of the transducer element, and the inner peripheral edge thereof, at the end adjacent the element, is substantially coincident in projection with the nodal contour of the element.

4. An electromechanical transducer according to claim 3, wherein the mullion is removably suspended in the opening and has a conical interior section the flare of which increases uniformly in the radially outward direction from the face of the element, and a bulbous exterior section which begins as a smooth curve from the inner peripheral edge of the end adjacent the element.

5. An electromechanical transducer according to claim 1 wherein the opposite face of the element is enclosed by the housing.

References Cited by the Examiner
UNITED STATES PATENTS
2,580,439  1/1952  Knock _____ 340—8

MILTON O. HIRSHFIELD, *Primary Examiner.*

A. J. ROSSI, *Assistant Examiner.*